(12) United States Patent
Sandusky et al.

(10) Patent No.: US 7,979,918 B2
(45) Date of Patent: Jul. 19, 2011

(54) PROTECTIVE COVERING

(75) Inventors: Donald Allan Sandusky, Landenberg, PA (US); Ryan Altenburger, Landenberg, PA (US)

(73) Assignee: Warrior Sports, Inc., Warren, MI (US)

( * ) Notice: Subject to any disclaimer, the term of this patent is extended or adjusted under 35 U.S.C. 154(b) by 0 days.

(21) Appl. No.: 12/372,615

(22) Filed: Feb. 17, 2009

(65) Prior Publication Data

US 2009/0255037 A1  Oct. 15, 2009

Related U.S. Application Data

(60) Provisional application No. 61/028,741, filed on Feb. 14, 2008, provisional application No. 61/111,839, filed on Nov. 6, 2008.

(51) Int. Cl.
*F41H 5/08* (2006.01)
*F41H 1/02* (2006.01)
*F41H 5/00* (2006.01)

(52) U.S. Cl. ............................................ 2/2.5; 89/36.05
(58) Field of Classification Search ........................ 2/2.5
See application file for complete search history.

(56) References Cited

U.S. PATENT DOCUMENTS

| | | | |
|---|---|---|---|
| 1,268,223 A | 6/1918 | Eimer | |
| 3,523,457 A | 8/1970 | Buck | |
| 3,707,004 A * | 12/1972 | Kapitan et al. | 2/2.5 |
| 3,793,648 A * | 2/1974 | Dorre et al. | 2/2.5 |
| 3,867,239 A | 2/1975 | Alesi et al. | |
| 4,198,707 A * | 4/1980 | Haupt et al. | 2/2.5 |
| 4,241,457 A | 12/1980 | Klein et al. | |
| 4,391,178 A * | 7/1983 | Pagano | 89/36.08 |
| 4,486,901 A | 12/1984 | Donzis | |
| 4,633,528 A * | 1/1987 | Brandt | 2/2.5 |
| 4,633,756 A * | 1/1987 | Rudoi | 89/36.02 |
| 4,642,814 A | 2/1987 | Godfrey | |
| 4,660,223 A * | 4/1987 | Fritch | 2/2.5 |
| 4,680,812 A * | 7/1987 | Weigl | 2/467 |
| 4,810,559 A | 3/1989 | Fortier et al. | |
| 4,985,931 A | 1/1991 | Wingo, Jr. | |
| 4,989,265 A | 2/1991 | Nipper et al. | |
| 5,007,108 A * | 4/1991 | Laberge et al. | 2/463 |
| 5,129,101 A | 7/1992 | Douglas | |
| 5,157,792 A * | 10/1992 | Allen et al. | 2/2.5 |
| 5,173,068 A * | 12/1992 | Dunn et al. | 441/65 |
| 5,327,811 A * | 7/1994 | Price et al. | 89/36.05 |
| 5,362,527 A * | 11/1994 | Harpell et al. | 428/33 |
| 5,395,477 A * | 3/1995 | Sandusky | 156/441 |
| 5,405,683 A * | 4/1995 | Sandusky et al. | 428/102 |
| 5,477,558 A * | 12/1995 | Volker et al. | 2/461 |

(Continued)

FOREIGN PATENT DOCUMENTS

EP   1190647   3/2002

(Continued)

*Primary Examiner* — Bobby H Muromoto, Jr.
(74) *Attorney, Agent, or Firm* — Warner Norcross & Judd LLP

(57) ABSTRACT

A protective covering with a hard outer layer and a soft inner layer. The hard outer layer comprises a plurality of substantially rigid shape-retaining and interworking tiles anatomically conformed to a contoured object. The outer layer has sufficient flexibility to adjust its conformity to the object as the object's contour changes. The soft inner layer comprises a plurality of impact absorbing units. The protective covering provides impact resistance and is designed to remain securely in place and protective of the object even when the contour of the object changes.

10 Claims, 8 Drawing Sheets

U.S. PATENT DOCUMENTS

| | | | |
|---|---|---|---|
| 5,515,541 A * | 5/1996 | Sacks et al. | 2/2.5 |
| 5,587,041 A * | 12/1996 | Sandusky et al. | 156/441 |
| 5,771,489 A * | 6/1998 | Snedeker | 2/2.5 |
| 5,996,115 A * | 12/1999 | Mazelsky | 2/2.5 |
| 6,093,468 A | 7/2000 | Toms et al. | |
| 6,098,196 A * | 8/2000 | Logan | 2/2.5 |
| 6,266,818 B1 * | 7/2001 | Howland et al. | 2/2.5 |
| 6,336,220 B1 | 1/2002 | Sacks et al. | |
| 6,500,507 B1 | 12/2002 | Fisher | |
| 6,807,891 B2 | 10/2004 | Fisher | |
| 6,892,392 B2 * | 5/2005 | Crye et al. | 2/2.5 |
| 7,363,846 B1 * | 4/2008 | Dean et al. | 89/36.05 |
| 7,533,599 B2 * | 5/2009 | Mogensen | 89/36.04 |
| 2002/0169236 A1 * | 11/2002 | Halterman et al. | 523/218 |
| 2004/0186213 A1 * | 9/2004 | Sandusky et al. | 524/445 |
| 2005/0267245 A1 * | 12/2005 | Sandusky et al. | 524/445 |
| 2006/0074190 A1 * | 4/2006 | McInnis et al. | 525/123 |
| 2008/0307553 A1 * | 12/2008 | Jbeili et al. | 2/2.5 |
| 2010/0162458 A1 * | 7/2010 | Beugels et al. | 2/2.5 |
| 2010/0170021 A1 * | 7/2010 | Van Es et al. | 2/2.5 |

FOREIGN PATENT DOCUMENTS

| | | |
|---|---|---|
| GB | 2154124 | 9/1985 |
| WO | WO8806413 | 9/1988 |
| WO | WO9205717 | 4/1992 |

* cited by examiner

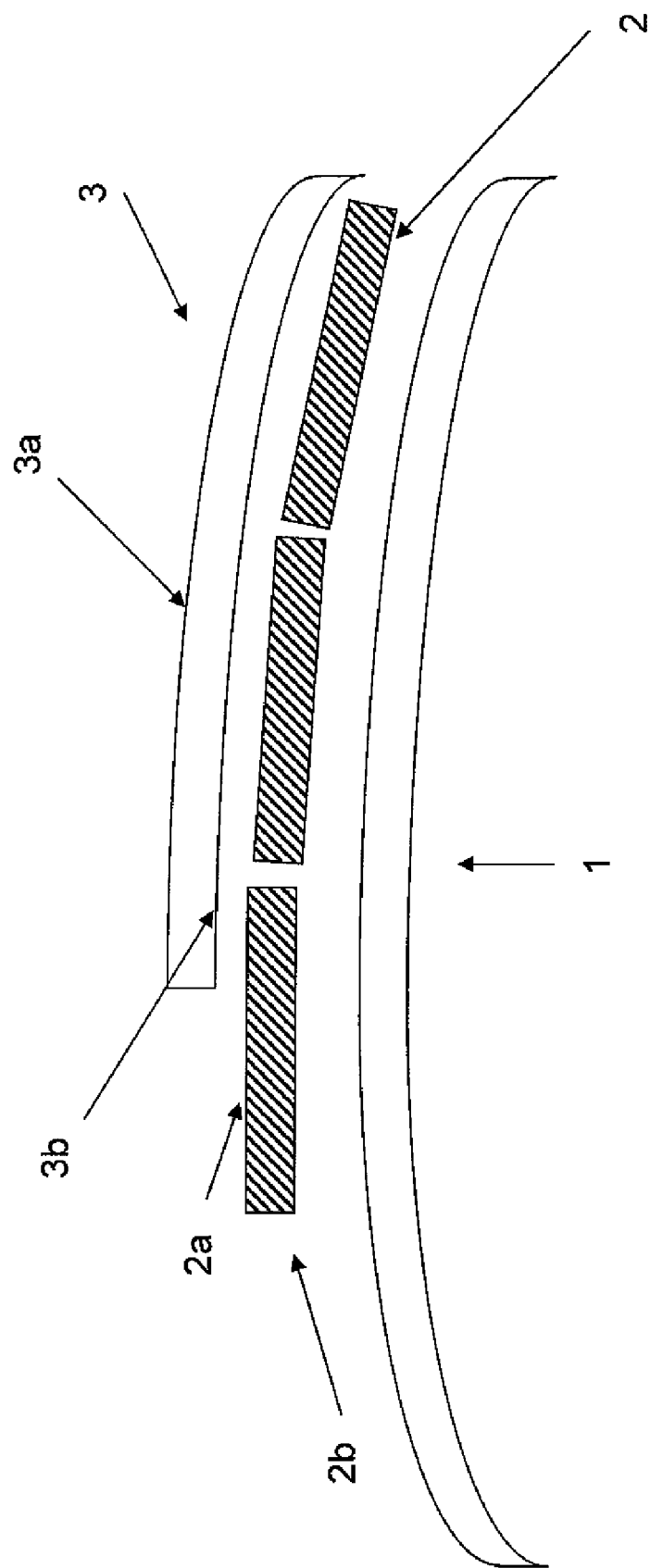

END VIEW – Outer Layer Plate

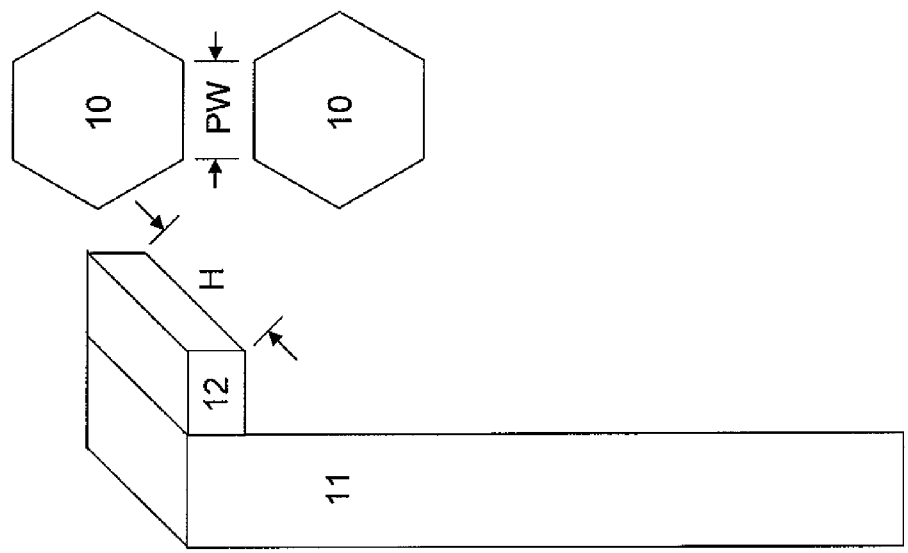
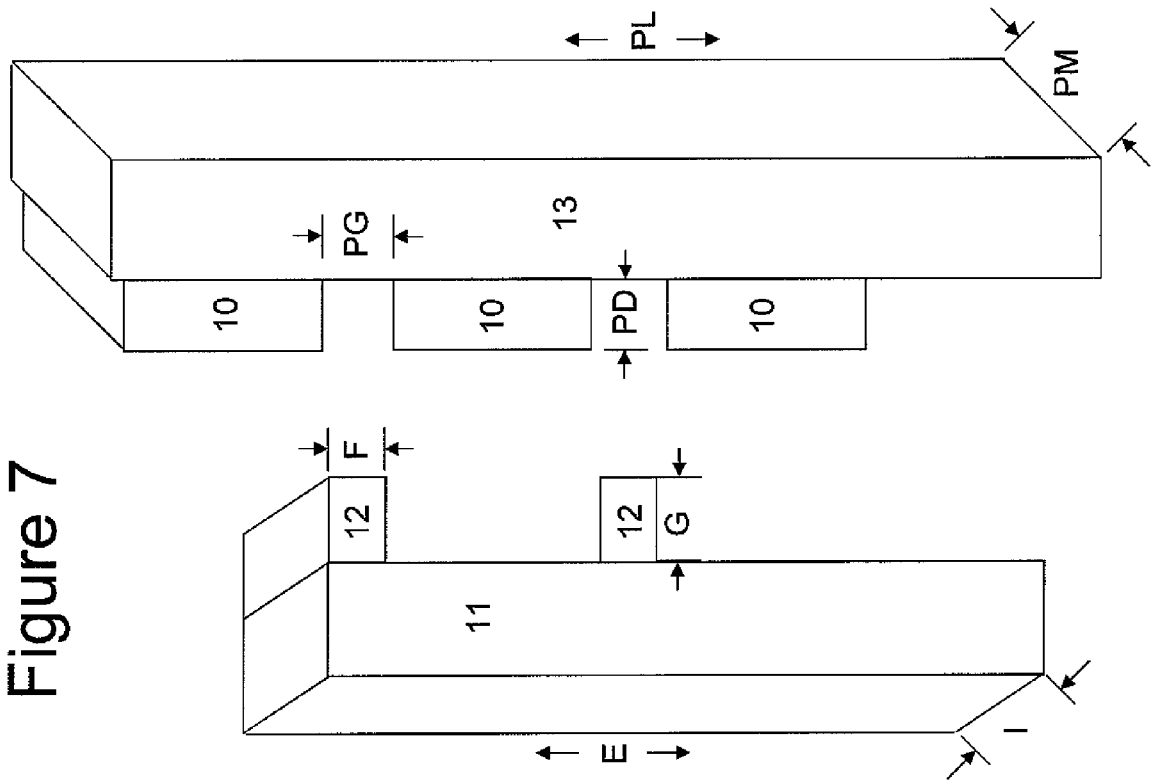
Figure 7

PROTECTIVE COVERING

CROSS REFERENCE TO RELATED APPLICATIONS

This application claims the benefit of U.S. Provisional Application No. 61/028,741 filed Feb. 14, 2008 and U.S. Provisional Application No. 61/111,839, filed Nov. 6, 2008, the contents of both of which are incorporated herein by reference.

FIELD OF THE INVENTION

The present invention relates to a protective covering suitable for impact resistance with at least one hard outer layer and at least one soft inner layer. The hard outer layer comprises a plurality of substantially rigid shape-retaining plates anatomically conformed to a contoured object. The outer layer comprises sufficient flexibility to adjust its conformity to the object as the object's shape changes. The soft inner layer comprises a plurality of impact absorbing units. The protective covering is designed to provide impact resistance and to remain securely in place to provide such protection even when the contour of the object changes.

BACKGROUND OF THE INVENTION

Protective padding is used to protect objects from damage or from experiencing an impact from applied forces. For personal protective devices, examples include pads worn by athletes or bullet proof vests. For industrial protective devices, examples include pipe or cable protective coverings or blast protectors in factories.

The increased popularity of physical sports has increased the need for protective personal padding. Sports activities such as baseball, basketball, football, ice hockey, field hockey, soccer, on-road and off-road biking, roller blading, roller skating, skateboarding, snow skiing, snowboarding, boogie boarding, surfing, and windsurfing have revealed that falls, collisions and impacts can result and cause pain, injury and damage to unprotected parts of the body.

Nevertheless, many existing protective paddings or devices do not adequately protect objects from pain, injury or damage resulting from impacts. To be effective, protective padding must be positioned over (e.g. covering) the protected object. However, protective padding may become displaced from its original or optimal position when an object is contoured or in motion. Protective devices are typically applied during rest and prior to activity. During activity, these devices can shift due to either improper fit, discomfort of the user or simple movement. Displaced padding does not provide optimal protection for objects from damage or otherwise experiencing an impact from forces being applied to them.

There is a need for protective coverings shaped to fit contoured objects wherein the coverings adjust to the contours of the objects when the object's contour changes while still providing protection and superior impact resistance in spite of such changes.

SUMMARY OF THE INVENTION

The present invention is directed to a protective covering that is shaped to fit a contoured or moving object and provide superior impact resistance. The protective covering of the present invention comprises at least one outer layer having a plurality of outer layer plates shaped to the contours or anticipated movement of an object to be protected. The outer layer plates are made of a substantially rigid, shape-retaining material. The protective covering also comprises at least one inner layer having a plurality of inner layer units made from impact absorbing materials.

The present invention is also directed to items comprising protective coverings of the present invention such as helmet s, neck braces, elbow pads, wrist pads, gloves, body armor, shoes, body garments, leg pads, knee pads, shin pads, ankle pads, elbow pads, jackets, shoulder pads, cable covers, pipe covers, railing pads, luggage and storage containers.

BRIEF DESCRIPTION OF THE DRAWINGS

FIG. 1 shows an object to be protected (1) covered by a soft inner layer (2) and a contoured hard outer layer (3). The upper surface of the inner layer (2a) and the lower surface of the inner layer (2b) are shown. The upper surface of the outer layer (3a) and the lower surface of the outer layer (3b) are shown.

FIG. 7 shows the optional support layer dimensions with respect to the protective covering.

DETAILED DESCRIPTION OF THE INVENTION

Figure 2A:
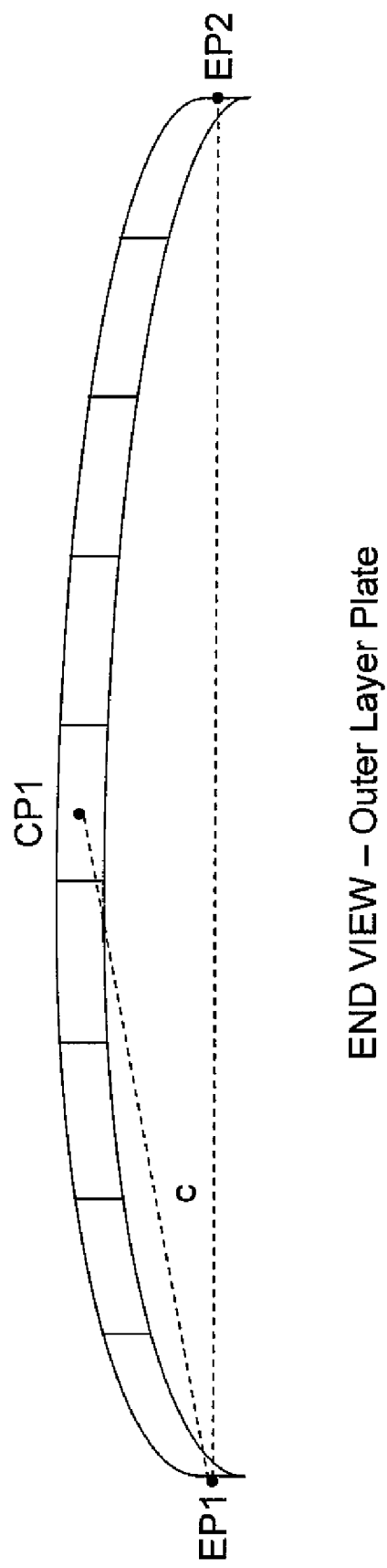
FIGS. 2(a) and 2(b) shows the thickness (d) and curvature (c) of the outer layer plate/individual tiles. Thickness being measured in the direction of the front of the plate/tile to the back of the plate/tile. Curvature is measured in degrees away from the central plane of a non-curved plate/tile.

As used herein the terms "Impact Test" and "Retention Test" refer to the tests described in "Test Method and Standard Performance Specification for Newly Manufactured Soccer Shin Guards", NOCSAE DOC (ND) 090-06m07.

Impact test: "Three identical shin guards shall each be impacted at three identical sites, with three impacts at each site. Time between successive impacts shall be 75 s±15. The center of any impact series shall not be less than 1.97 inches (50 mm) from any previous impact series nor closer to any edge than 0.59 inches (15 mm). Impact locations shall be selected to include any apparent weak points but must lie within the area of coverage. At least one impact site shall be in the central portion of the guard, and at least one impact a site shall be within the lateral portion of the guard. If guards are labeled left and right at least one of each side shall be tested. NOTE: In the event that the extent of protective coverage lies within the 15 mm 'offset' from the edge the impact center must still be 15 mm from the edge. However in any case where the test area was limited by the 15 mm offset the guards' protective properties must extend to the edge of the extent of protective coverage.

Each shin guard shall be fastened onto the leg anvil in such a way as to limit movement during impacts. The leg anvil is positioned so that the striking face of the spherical impactor impacts the surface of the shin guard.

The spherical impactor is raised above the shin guard and allowed to fall striking the shin guard at [specified velocities] for each location chosen. Velocities shall be measured within 1 inch (25.4 mm) of the impact. Central Portion 5.67±0.17 Ft/Sec Lateral Portion 2.46±0.07 Ft/Sec.

The impact location, resultant peak (g) and velocity shall be recorded for each impact. When tested according to Section 10, the mean peak (g) of the three impacts delivered to the same impact site shall not exceed 200 g. No single impact shall exceed 225 g."

Retention Test: "Attach the shin guard onto the leg anvil following the manufacturer's fitting instructions. Using a spring balance, force gauge or other suitable device, apply a test force of 15±2 N tangential to the surface of the shin guard. The force can be applied in any direction except in the direction corresponding to the downward direction when the shin guard is worn as in play according to the manufacturer's fitting instructions. This force is applied for not less than 30 s nor more than 45 s. The displacement of the shin guard is measured when the force is removed and recorded. When tested according to Section 11, on release of the force, the displacement of the shin guard from its initial position shall be less than 0.75 inches (19 mm)."

The present invention is directed to a protective covering for a contoured object that is adapted to conform to the physiology or structure of the component and to maintain protection even if the contour of the component changes. The protective covering comprises at least one outer layer plate having a plurality of outer tiles and at least one inner layer preferably having a plurality of inner layer units. The outer layer of the protective covering transmit impacts to the inner layer and the inner layer acts as a support and/or impact absorber for the outer layer.

FIG. 1 shows one embodiment of the present invention. The object to be protected (1) may be contoured. The protective covering may comprises two layers, an inner layer (2) and an outer layer plate (3). The inner layer (2) comprises individual units that have an upper surface (2a) and a lower surface (2b). The outer layer plate (3) comprises individual tiles that have an upper surface (3a) and a lower surface (3b).

The outer layer plate is preferably anatomically conformed to the contoured object to be protected. More specifically, the plurality of individual shape retaining, interworking outer layer tiles that make up the outer layer plate are preferably anatomically conformable to the shape of the component such that the protective covering adapts to the user's specific physiology. The protective covering of the present invention has more flexibility than other solid pads due to the presence of these individual outer layer tiles. As such, there is no need to customize the individual protective covering to an individual user or contoured object. In addition, the outer layer tiles are interspersed in such a way to allow the protective covering to adjust its shape to the resulting shape changes that occur when the contour of the component changes, such as through motion.

The outer layer plate of the invention is manufactured in such a way that it is anatomically conformable to the specific physiology or structure of the component to which it is being applied. The covering is preferably capable of adjusting it conformity to the object as the contour of the object changes. In a preferred embodiment, the individual outer tiles are initially arranged in the general shape of the component on a flat surface forming a flat outer layer plate. This flat outer layer plate is then incorporated into a mold of the desired component, for example an elbow, and molded into that shape using typical molding techniques such as blow molding, extrusion molding, injection molding, rotational molding and pressure forming. The end result is a set of uniquely, three-dimensionally shaped outer layer tiles that make up the outer layer plate of a protective covering that is anatomically formed to a specific component (i.e. an elbow). In a preferred embodiment, each individual outer tile has its own unique three-dimensional shape that allows the protective covering to be conformable to each individual's physiology for the particular component (i.e. elbow) to be protected.

The shape of the outer layer tiles may be any shape such as round, square, rectangle, star, polygon or other. Preferably, the shape of the outer layer tiles is geodesic. The protective covering may include more than one type of shaped tile. The shapes may be any shape that can be configured to overlay preferably at least three inner layer units. Inner layer units are described later in this document. Preferably, the outer layer tiles will overlay at least three of the inner layer units and form a continuous surface over the contoured or moving object to be protected. The outer layer tiles are preferably abutting each other within the outer layer. Abutting tiles preferably have complementary mating edges with adjacent tiles that are anatomically formed to a specific component and allows the protective covering to be conformable to the physiology or structure of the particular component to be protected.

In another embodiment, one or more of the abutting outer layer tiles may overlap one or more abutting outer layer tiles. The overlapping outer layer tiles may be overlapped in one or more directions. For example, the bottom edge of one or more tiles may overlap the top edge of one or more abutting tiles while within the same protective covering a right edge of one or more tiles may overlap the left edge of one or more abutting tiles.

The material used to form the outer layer tiles will also vary with the object or moving part to be protected. Preferably, the material will be a substantially rigid, shape-retaining material such as a ceramic, a metal, a plastic, a fiber reinforced plastic, a metal alloy, a rapid solidification material or metal, or a ceramic foam. For example, protection from impacts resulting from a football tackle may require a soft, but rigid, thermoplastic material. In contrast, protection from the impact of a bullet or an industrial accident may require KEVLAR® or a metal based material. Any rigid, shape-retaining material known in the sports and industrial protective covering industry may be used, such as those disclosed in any of U.S. Pat. Nos. 1,268,223; 3,523,057; 3,867,239; 4,241,457; 4,486,901; 4,160,034; 4,642,814; 4,810,559; 4,985,931; 4,989,265; 5,129,101; 6,093,468; 6,336,220; 6,500,507; 6,807,891; EP No. 1,190,647; WO 88/06413; WO92/05717; and GB 2,154,124, all of which are incorporated in their entirety herein by reference.

Figure 2B:
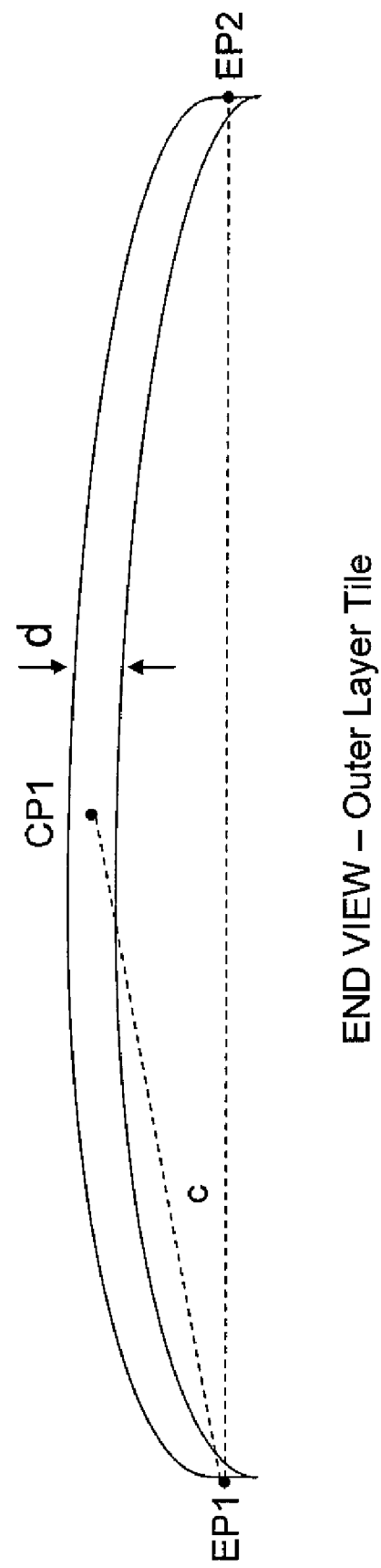

The outer layer plate as well as the individual tiles may be geometrically or anatomically shaped, defined by acute, obtuse, right or reflex angles and having both a thickness and curvature. As illustrated in FIGS. 2(a) and 2(b), the curvature (c) and thickness (d) of the plate and tiles can be measured. Both the outer layer plate and individual tiles can possess different thicknesses and curvatures. Thickness being measured in the direction of the front of the plate/tile to the back of the plate/tile. Thickness can range from about 1 mm to about 5 mm, preferably between about 1.5 mm and about 3.0 mm. In a preferred embodiment, the thickness is 2.8 mm.

Curvature of non-circular protective coverings may be measured as degrees away from the central plane of a non-curved plate/tile. Curvature is the angle between the line connecting the endpoint (EP1) on one side of the plate/tile and the endpoint (EP2) on the opposite side of the plate/tile and the line between EP1 and the center point (CP1) of the plate/ tile. Curvatures can range between about 0 degree and about 90 degrees, preferably between 10 degrees and about 45 degrees.

Curvature may also be measured as the curvature of a cylinder having a defined diameter. Curvatures can range from about 25 mm to about 750 mm, preferably between about 50 mm and about 500 mm in order to approximate anatomical curvatures. In the case where the application is very large in diameter, curvatures may be substantially similar to the item being protected. The largest dimensions of the plate/tiles preferably range between about 10 mm to about 500 mm, preferably about 10 mm to about 25 mm.

The size and shape of the outer layer plate and the individual tiles vary according to the contour and range of motion of the object to be protected. For example, outer layer tiles for a shin pad may have a size ranging from about 0.1 cm to about 5 cm in diameter, from about 0.007 $cm^2$ to about 20 $cm^2$ in surface area, and from about 0.01 cm to about 0.5 cm in thickness. The shape of the outer layer tiles for the shin pad preferably will be slightly curved to match the roundness of a user's lower leg. The degree of curvature may vary throughout the outer layer plate. For example, the curvature may vary from top to bottom and side to side across the outer layer plate of the shin to account for the tapering of the leg closer to the ankle and rounder sections around the leg.

In contrast, outer layer plate and individual tiles for an elbow joint in an industrial oil pipe line may range from about 1 cm to about 10 m in diameter, from about 0.7 $cm^2$ and 78,000,000 $cm^2$ in surface area, and from about 0.1 cm to about 1 m in thickness. The shape of the outer layer plate and individual tiles for the industrial oil pipe line preferably will be curved to match the roundness of the object to be protected. For example, the degree of curvature may vary around the pipeline such as the innermost section having the most curvature and the outermost section having the least curvature.

Figure 3:
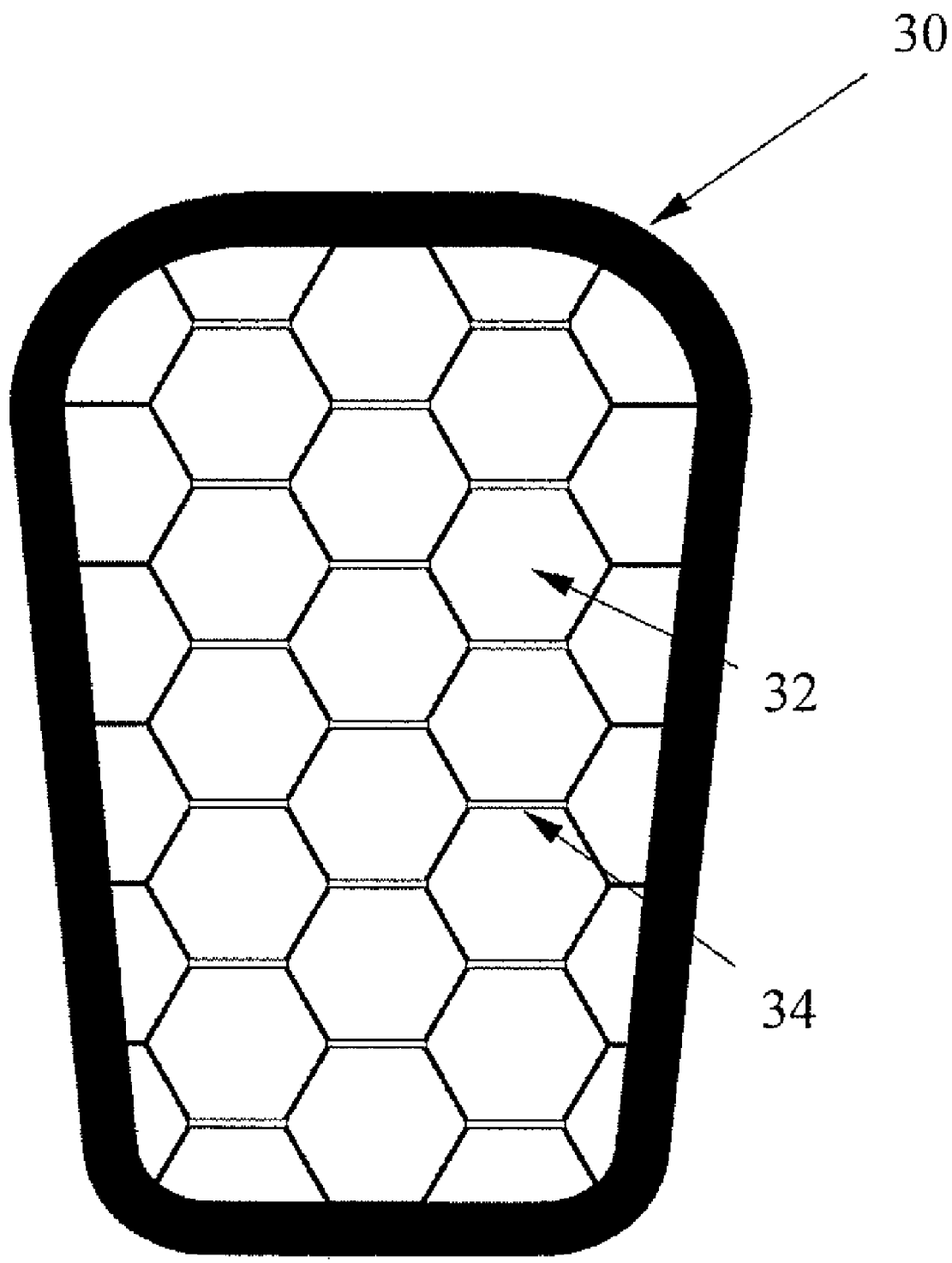
FIG. 3 shows hexagon shaped outer layer tiles attached to a support. The outer layer tiles are overmolded onto an elastic support.

The outer layer tiles may be adhered or fastened to fabric or elastic support prior to being attached to other layers (e.g. inner layer, intermediate layer). The fabric or elastic support may be any woven or non-woven fabric or elastic support known in the industry including, but not limited to, spandex, polyester and nylon (about 250 gram weight or higher, preferably 350 gram weight or higher). The outer layer tiles may be adhered to the fabric or elastic support by any technique mentioned herein or known in the art including, but not limited to, over-molding, stitched or adhered. One embodiment is shown in FIG. 3. FIG. 3 shows hexagon shaped outer layer tiles (32) attached to a flexible support (30). In between the outer layer tiles (32) are the projections from the optional support member (34), discussed later in this document. Specifically, the outer layer tiles are over-molded onto polyester fabric, 350G (i.e. 350 gram weight). By adhering the outer layer tiles to such a flexible fabric, the resulting protective covering is better able to fit over flexible joints such as elbows and knees.

The inner layer is preferably a flexible substrate material onto which the outer plates can be attached such that the inner layer maintains the same conformity as the outer layer. The inner layer preferably comprises inner layer units that may be abutting each other or may be spaced with gaps. The inner layer units are preferably abutting each other within the inner layer. In a configuration where some inner layer units are not abutting each other, air pockets may fill the space which can be filled with air. The inner layer units may be made to be compressible, such as by using, for example, reticulated foam, trapped air laminate or any similar material commercially available from Sealed Air, Inc. which is a global supplier of packaging materials. Ultimately, the inner layer is designed to perform like a spring that adsorbs kinetic from a blunt force impact against the solid, substantially incompressible, outer plates.

The inner layer may comprises a plurality of single material units made from different materials. Each individual inner layer unit may also be made from more than one materials. For inner layers comprising multiple single material units, the units are preferably uniformly dispersed within the inner layer with preferably three inner units per outer layer tile. When using inner layer units of different materials, the dispersion is preferably such that each outer layer tile is in contact with at least one inner layer unit made from each type of material used. Preferably, the inner layer contains single material units made from two, three or four different types of material.

The inner layer units are preferably formed from an impact absorbing material, such as reticulated plastic foam, compressible air bladders or compressible mechanism (e.g. springs). The inner units preferably have a high resistance to local deformation. The material used will vary with the object or moving part to be protected. For example, protection from impacts such as being tackled in football may require a foam inner layer. In contrast, protection from the impact of a bullet or an industrial accident may require a more sturdy thermoplastic. Any impact absorbing material known in the sports and industrial protective covering industry may be used, such as those disclosed in U.S. Pat. Nos. 1,268,223; 3,523,057; 3,867,239; 4,241,457; 4,486,901; 4,160,034; 4,642,814; 4,810,559; 4,985,931; 4,989,265; 5,129,101; 6,093,468; 6,336,220; 6,500,507; 6,807,891; EP No. 1,190,647; WO 88/06413; WO92/05717; and GB 2,154,124, all of which are incorporated in their entirety herein by reference.

The shape of the inner layer units may be any shape such as round, square, rectangle, star, or polygon The size and shape may be any that can be configured to have preferably at least three inner layer units overlaid by an outer layer tile. The length and width of the inner layer units may also be any size whereby that the impact to be resisted is sufficiently absorbed.

Figure 4:
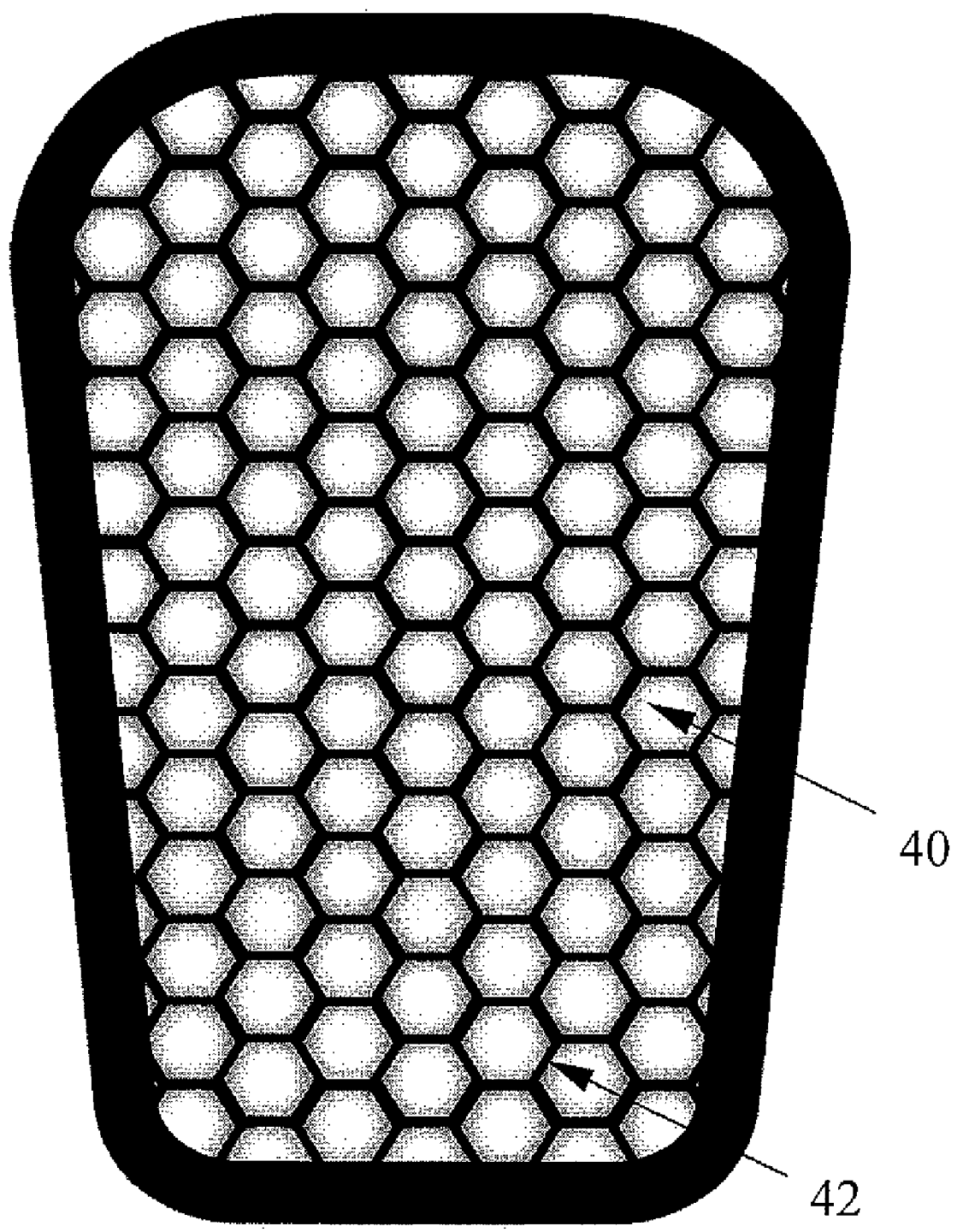
FIG. 4 shows hexagon shaped inner layer units on the bottom surface of the protective covering.

FIG. 4 shows one embodiment of the present invention. The inner layer units (40) are shown to substantially fill the entire bottom surface of the protective covering. The inner layer units are hexagon shaped and spaced sufficiently to allow room for air flow in the gaps (42), as well as, compaction upon receiving an applied force. Specifically, the inner layer is 9 mm embossed EVA foam having a dimpled texture and laminated to spandex.

The interface between the outer layer plate's bottom surface and the inner layer's upper surface is shown in FIG. 1. Preferably, the upper surface of the inner layer is connected to the bottom surface of the outer layer. Alternatively, the connection may be physical such as tying, wrapping, encasing or anchoring with a string, rope, fabric or tape. The connection may be chemical such as bonding, gluing, or melting a thermoplastic resin, glue, or adhesive. Any physical or chemical connection means or material known in the sports and industrial protective covering industry may be used, such as those disclosed in U.S. Pat. Nos. 1,268,223; 3,523,057; 3,867,239; 4,241,457; 4,486,901; 4,160,034; 4,642,814; 4,810,559; 4,985,931; 4,989,265; 5,129,101; 6,093,468; 6,336,220; 6,500,507; 6,807,891; EP No. 1,190,647; WO 88/06413; WO92/05717; and GB 2,154,124, all of which are incorporated in their entirety herein by reference.

The inner layer units may be geometrically shaped, defined by acute, obtuse, right or reflex angles and having a thickness. Thickness, measured for the inner layer units the same way as measured for the outer layer plate and tiles, can range from about 1 mm to about 25 mm, preferably between about 3 mm and about 6 mm.

The largest dimensions of the inner layer units preferably range between about 5 mm to about 200 mm in diameter, more preferably about 10 mm to about 25 mm. The surface area of the inner layer units preferably range from about 0.1 $cm^2$ to about 350 $m^2$, more preferably from about 0.7 $cm^2$ to about 5 $cm^2$.

In the adhering the outer layer plate to the inner layer, it is preferred that, at the time of adherence, the inner layer is pre-formed in the shape of the component to which the outer layer plate has been formed prior to adhering the outer layer plate thereto. This can be accomplished by placing the inner layer on the same mold from which the outer layer plate was formed, and then applying the outer layer plate thereto. More preferably, the two layers are adhered together while one of the layers is still on the mold.

An intermediate layer may be present between the outer layer plate and the inner layer. The intermediate layer may be connected to the outer and inner layers by any of the physical or chemical methods disclosed in this application. The intermediate layer may serve to bind the outer and/or inner layers together individually or in concert, to protect either the outer or inner layer form damage or deterioration, or support the structure of the protective covering. Examples of an intermediate layer include, but not limited to, EVA form, polyethylene plastic, trapped air laminate or any similar material commercially available from Sealed Air, Inc. The thickness of the intermediate layer can range from about 0.1 mm to about 10 mm. In a preferred embodiment, the thickness is 1.2 mm polypropylene or 6 mm EVA foam.

The protective covering of the present invention is useful for providing improved impact resistance by dispersing a load and/or force. The outer layer tiles preferably disperse the impact from a source over at least three inner layer units. The inner layer units may be made from different materials and may be interspaced with a gas or both. The inner layer units simultaneously absorb the impact. The contoured shape of the outer layer tiles disperse the impact substantially evenly over the inner layer and, thus, substantially over the object to be protected. By evenly dispersing the impact, the object being protected experiences less of an impact.

Different outer and inner layer designs may be employed for the protective coverings of the present invention. In one embodiment, the area of likely impact or the center of the protective covering may have larger outer layer tiles relative to the other tiles. The larger tiles disperse the force over a larger area. In another embodiment, the outer layer tiles may overlap with abutting outer layer tiles. The abutting and overlapped outer layer tiles form an interworking tile configuration. Preferable, the outer layer tiles are formed to have either raised or lowered edges. Abutting outer layer tiles are preferably configured to have raised-edge tiles abutting lowered-edge tiles. The overlaid sections can be formed to allow flexibility of the outer layer during motion or when experiencing an impact from an outside force.

In another embodiment, the present invention may be applied to sports bra protective coverings. In this embodiment, the hard layer tiles have mixed shapes, such as both polygonal and reptilian scale shapes. The shapes may abut each other or may overlap. The hard outer layer tiles may further comprise an edging around the outer edges of some or all of the outer layer tiles. The edging preferably creates a clean/snag free edge.

The protective covering of the present invention is useful for remaining in place during activity or while the contoured object is moving. The protective covering is self-correcting and self-stabilizing. The individual outer layer tiles are individually shaped to comport with the overall mold/shape of the contoured object. The contoured shape preferably fits best over the contoured object it is designed to cover. Any movement of the protective covering from the best fit, is preferably corrected by the subsequent movements back to the best fit. The contoured shape is preferably self-correcting when moved from the best fit position.

Moreover, the contoured shape of the outer layer plate preferably provides more comfort to the user. A more comfortable fit will preferably encourage the user to maintain the protective covering in the best fit location.

The protective covering may optionally include one or more support members. The support members may be located in between the outer layer and inner layer or on the inner surface of the covering. Preferably, the support members are located between the outer layer and inner layer. The support member may be made out of rigid or semi-rigid materials, such as plastics, metals, wood and laminates thereof or elastic materials such as vulcanized rubbers, polyurethane rubbers and elastomers, silicone and neoprene rubbers Preferably, the support member is made of plastics such as polyethelyne, polypropylene, polyester and polyamide.

Industry standards for protective coverings require the coverings to be protective. For example, soccer shin guards must pass performance standards defined by NOCSAE DOC (ND) 090-06m07 in which a predetermined impact force must be reduced below a threshold level and the shin pad must remain in position after impact. For example, shin pad protection should pass the Impact Test with a result between mean peak (g) of the three impacts delivered to the same impact site shall not exceed 200 g. No single impact shall exceed 225 g. Also, the shin pad protection should pass the Retention Test such that on release of the force, the displacement of the shin guard from its initial position shall be less than 0.75 inches (19 mm). The intermediate layer and the support members may be used to provide additional impact force properties to the flexible coverings of the present invention to pass respective industry standards.

Figure 5:
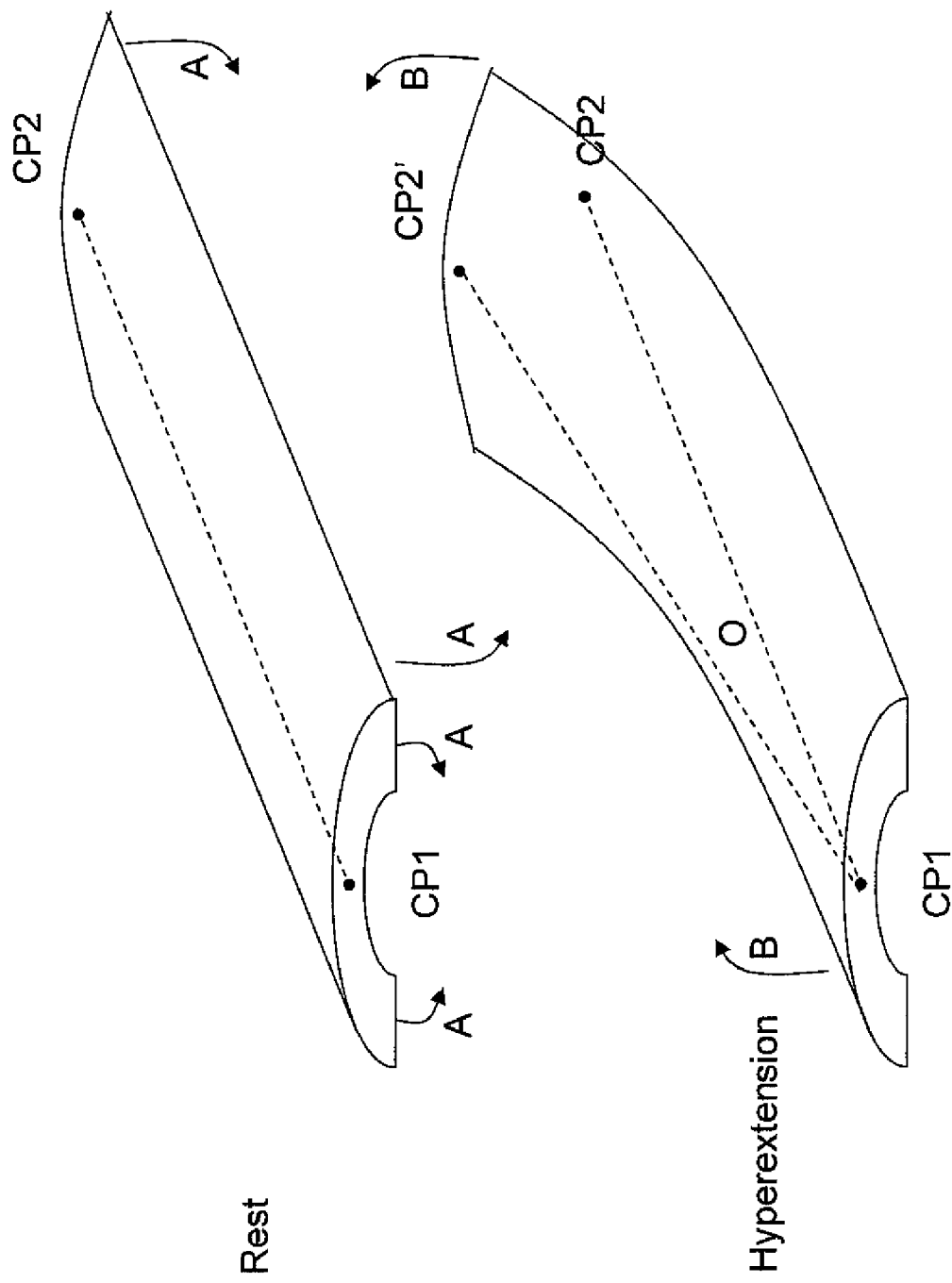
FIG. 5 shows the motion of the protective coverings. The protected coverings may bend freely in the direction of the contour or shape of the outer layer plate/individual tiles (A). Yet, the opposite direction the protective covering may not bend freely (B).

The support members may also assist the protective coverings of the present invention to resist hyperextension in the direction opposite of the overall contour or shape of the outer layer plate. As shown in FIG. 5, the protective covering may bend freely in the direction of the contour or shape of the outer layer plate (A). Yet, the opposite direction the protective covering may not bend freely (B). Using the members, the protective covering of the present invention may resist hyperextension such that O, the angle of hyperextension, is less than about 10 degrees. Preferably, O is less than about 5 degrees. Most preferably, O is less than about 3 degrees. Ideally, O is less than about 1 degree. O may be measured in degrees away from the central plane of a non-extended protective covering. O is the angle between the line connecting the center point (CP1) on one side of the protective covering and the center point (CP2) on the opposite side of the protective covering and the line between CP1 and the flexed center point (CP2') of the protective covering.

Figure 6:
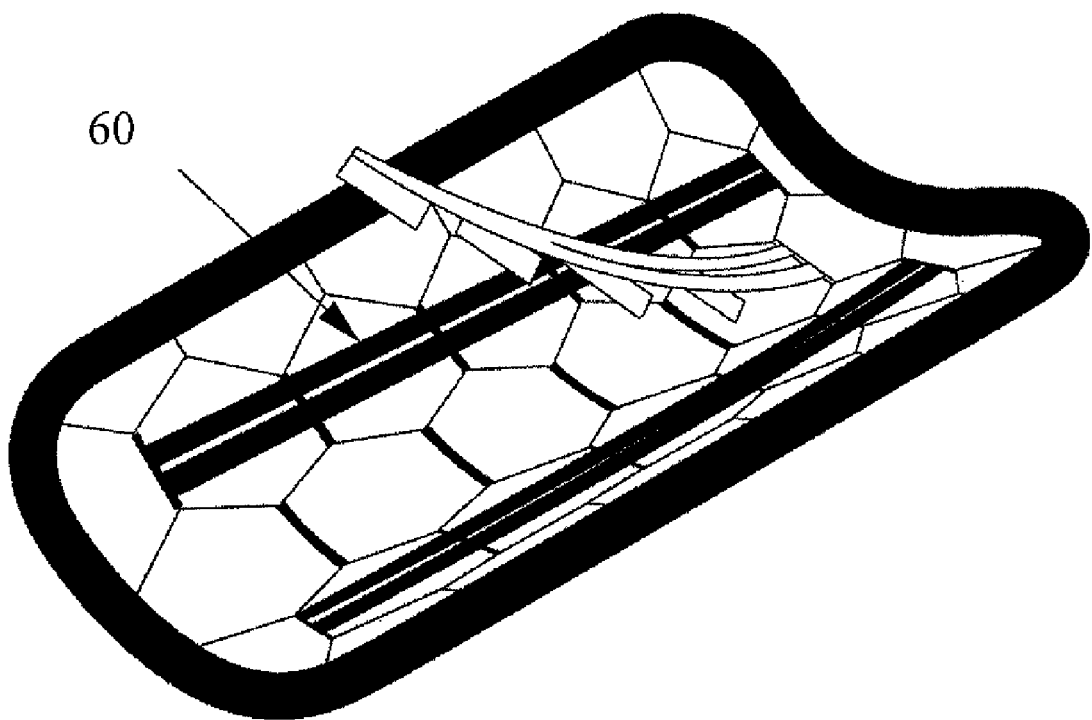
FIG. 6 shows a shin pad with a support layer in the form of long and narrow stiffening spines.

The optional support members may be removable. The members be attached by chemical means such as rubber cement, epoxy, acrylonitrile glues or physical means such as Velcro or mechanical interlocking. Preferably, the members are removably attached by comprising projections that poke through and pinch between the tiles. FIGS. 3 and 6 shows a protective covering comprising three support members (60). The support member projections poke through and pinch between the outer layer plates.

The support members may be attached to the covering laterally, longitudinally, diagonally or a mixture of directions. The members may be curved or straight. For example, a member made of rigid material and placed laterally in the protective covering may have a curvature to match the curvature of the plate/tiles or the object/body part to be protected. Non isotropic flexibility and stiffness may be facilitated by applying a support member layer in lateral, longitudinal or diagonal configurations. FIG. 7 shows the dimensions of the optional support members.

Preferably, the member (11) has a length (E) of about 99% to about 25% of the length (PL) of the protective covering (13). The block structure of the protective covering (13) is provided merely to illustrate the length and width measurements of the optional supports. More preferably, the member has a length of about 95% to about 50% of the length of a protective covering (e.g. a shin guard). Preferably, the member has a width (I) of about 50% to about 1% of the width (PM) of the protective covering (e.g. a shin guard).

The shape of the members may be any shape, preferably square, rectangular or curved resemblances thereof. The members may have projections spaced along the side facing the covering, preferably spaced evenly with the gaps in the protective covering, such as a projection every gap or alternative gap.

Preferably, the support member projections (12) have a length (F) of about 100% to about 50% of the maximum or largest gap length (PG) between the plates (10). The maximum gap length includes the length the tiles are apart when the fabric is stretched (e.g. elastic fabrics). More preferably, the projections have a length of about 99% to about 50% of the maximum or largest gap length between the tiles. Most preferably, the projections have a length of about 85% of the maximum or largest gap length between the tiles.

Preferably, the support member projections (12) have a thickness (G) of about 100% to about 50% of the gap thickness (PD) between the tiles (10). More preferably, the projections have a thickness of about 99% to about 50% of the gap thickness between the tiles. Most preferably, the projections have a thickness of about 85% of the gap thickness between the tiles.

In one embodiment, hyperextension of the protective covering is limited when the length (F) and the thickness (G) are both about 100% to about 85% of (PG) and (PD), respectively. Preferably, hyperextension of the protective covering is limited when the length (F) and the thickness (G) are both about 100% to about 95% of (PG) and (PD), respectively. More preferably, hyperextension of the protective covering is limited when the length (F) and the thickness (G) are both about 100% to about 99% of (PG) and (PD), respectively.

Preferably, the support member projections (12) have a width (H) of about 100% to about 50% of the gap width (PW) between the tiles (10). More preferably, the projections have a width of about 99% to about 50% of the gap width between the tiles. Most preferably, the projections have a width of about 85% of the gap width between the tiles.

The protective covering of the present invention may be used in many applications, such as in athletic gear and apparel, protective clothing and protective barriers. Objects that may be protected using an item comprising a protective covering of the present invention include all parts of the human body such as the head, the neck, the shoulders, the arms, the elbow, the wrist, the hands, the chest, the torso, the groin, the legs, the back, the buttocks, the knees, the shins, the ankles and the feet. Objects that may be protected also include industrial structures such as pipes, cables and railings. Items that may comprise the protective covering include helmets, neck braces, elbow pads, wrist pads, gloves, body armor, shoes, body garments, leg pads, knee pads, shin pads, ankle pads, elbow pads, jackets, shoulder pads, cable covers, pipe covers, railing pads, luggage and storage containers. Any athletic gear and apparel, protective clothing or protective barrier known in the sports and industrial protective covering industry may be protected, such as those disclosed in U.S. Pat. Nos. 1,268,223; 3,523,057; 3,867,239; 4,241,457; 4,486,901; 4,160,034; 4,642,814; 4,810,559; 4,985,931; 4,989,265; 5,129,101; 6,093,468; 6,336,220; 6,500,507; 6,807,891; EP No. 1,190,647; WO 88/06413; WO92/05717; and GB 2,154,124, all of which are incorporated in their entirety herein by reference.

An additional advantage of the protective coverings of the present invention is these novel coverings are aesthetically pleasing to wear due to their conformed fit and compact size. For example, contemporary soccer goalie pants comprising protective padding are bulky and visually displeasing. Replacement of the padding with the protective coverings of the present invention reduces the bulky appearance, provides a contoured fit, and superior protection.

EXAMPLES

Example 1

A Shin Pad

A protective covering for a shin was manufactured from a plastic shin cover using a commercially available shin pad and a layer of padding. The padding layer comprised a plurality of soft padding units. The plastic shin cover was cut into hexagonal pieces approximately 2 cm in diameter. The pieces were placed on the padding in essentially the same way the pieces were aligned in the original, uncut shin pad prior to cutting. The pieces were connected to the padding by a thermoplastic fiber. A fiber was passed through the center of a piece and through the padding and tied off at each end. Finally, the excess padding was removed. Representative shin pads are shown in FIGS. 3 and 6.

Example 2

A Sports Bra

A protective covering for a sports bra was manufactured from a hard shell plastic mold of a female body and a layer of padding. The padding layer comprised a plurality of soft padding units. The plastic mold was cut into hexagonal pieces approximately 2 cm in diameter. The pieces were placed on the padding in essentially the same way the pieces were aligned in the original, uncut mold prior to cutting. The pieces were connected to the padding by a hot melt adhesive. The excess padding was removed. The protective covering was connected to a fabric in the shape of a sports bra.

Example 3

A Soccer Football Shin Pad

Protective coverings for a shin were manufactured by overmolding 32 separate geometric outer tiles onto a mesh polyester fabric in a way that resulted in a permanent bond. Polypropylene plastic was over-molded (e.g. insert-molding) by injected onto 350G polyester fabric forming outer tiles with a maximum thickness of 2.8 mm. The padding layer comprised a uniform reticulated EVA (ethylene vinyl acetate)

foam heat embossed into the form of a plurality of soft padding units. These two components were attached to each other by sewing the perimeters together. An optional intermediate layer was used. The intermediate layer was placed in-between the outer layer plate and the inner layer. The intermediate layer comprised either EVA foam or polyethylene plastic, each having an elongated trapezoid shape about 7 cm wide at the top, about 5 cm wide at the bottom, about 16 cm tall, and about a 0.6 cm thickness. Finally, the excess padding was removed. Representative shin pads are shown in FIGS. 3 and 6.

Example 4

Temperature Performance Testing

The protective covering of the present invention is believed to possess unexpectedly beneficial heat removal from the contoured object the protective covering is protecting. The protective covering is believed to be breathable to allow the flow of air and moisture in two directions. First, the raised inner pads by virtue of creating an air gap between the contoured object (e.g. skin, shoulder, forearm, pipe) provide space for air movement to occur. Second, the gaps in the outer layer tiles, inner layer and fabric/elastic/mesh also provide for air movement. The protective covering of the present invention can be tested against commercially available contemporary pads by using heat sensors on the skin underneath the pads to monitor the temperature of the protected objects. It is believed that such testing will show that the protective coverings of the present invention will provide surprisingly effective heat removal in addition to providing superior protection.

What is claimed is:

1. A protective covering for a contoured object comprising:
    (a) an outer layer plate conformable to said contoured object comprising a plurality of individual outer layer tiles, each individual outer layer tile having an upper surface, a lower surface and wherein at least one individual outer layer tile has a geodesic shape;
    (b) an inner layer comprising a plurality of individual inner layer units, said inner layer having an upper surface and a lower surface, wherein the upper surface of the inner layer is connected to the lower surface of the outer layer tiles;
    wherein said covering is capable of adjusting its conformity to the object as the contour of the object changes;
    wherein the outer layer tiles are formed from a substantially rigid, shape-retaining material and the inner layer units are formed from an impact absorbing material;
    wherein at least two individual outer layer tiles each overlays at least a portion of three individual inner layer units, the three individual inner layer units not overlapping one another;
    wherein each individual outer layer tile has its own unique curvature and three-dimensional shape; and
    wherein the at least two individual outer layer tiles that each overlay at least a portion of three individual inner layer units are each configured and dimensioned to disperse a received impact from a source over the three respectively overlaid individual inner layer units.

2. The protective covering of claim 1 wherein the outer layer tiles abut each other.

3. The protective covering of claim 1 wherein the outer layer tiles overlay each other.

4. The protective covering of claim 1 wherein the inner layer units are formed from two impact absorbing materials and the individual inner layer units are substantially uniformly dispersed within the inner layer.

5. The protective covering of claim 1 wherein the outer layer tiles and inner layer units are connected by a fabric, a thermoplastic or an adhesive.

6. The protective covering of claim 1 further comprising an intermediate layer wherein the intermediate layer is positioned between the outer and inner layers and connected to both the outer and inner layers.

7. The protective covering of claim 1 further comprising at least one support member located in between the outer layer and inner layer.

8. The protective covering of claim 7 wherein the protective covering resists hyperextension.

9. The protective covering of claim 7 wherein the protective covering bends less than about 10 degrees in the direction opposite of the overall contour of the outer layer plate.

10. An item of comprising the protective covering of claim 1 selected from the group consisting of a helmet, a neck brace, an elbow pad, a wrist pad, a glove, body armor, a shoe, a body garment, a leg pad, a knee pad, a shin pad, an ankle pad, an elbow pad, a jacket, shoulder pads, a cable cover, a pipe cover, a railing pad, luggage and a storage container.

* * * * *